United States Patent
Castelli et al.

(10) Patent No.: US 7,933,740 B2
(45) Date of Patent: Apr. 26, 2011

(54) SYSTEMS AND METHODS FOR STRUCTURAL CLUSTERING OF TIME SEQUENCES

(75) Inventors: Vittorio Castelli, Croton-on-Hudson, NY (US); Michail Vlachos, Elmsford, NY (US); Philip S. Yu, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/550,571

(22) Filed: Aug. 31, 2009

(65) Prior Publication Data
US 2010/0057399 A1 Mar. 4, 2010

Related U.S. Application Data

(63) Continuation of application No. 12/115,824, filed on May 6, 2008, now abandoned, which is a continuation of application No. 11/096,485, filed on Mar. 31, 2005, now Pat. No. 7,369,961.

(51) Int. Cl.
*G06F 17/18* (2006.01)
*H04B 15/00* (2006.01)

(52) U.S. Cl. ........ 702/176; 702/167; 702/182; 702/189; 702/190; 703/2; 706/46; 706/900; 707/999.1

(58) Field of Classification Search .................. 702/167, 702/176, 182, 189, 190; 703/2; 706/46, 706/900; 707/999.1
See application file for complete search history.

(56) References Cited

U.S. PATENT DOCUMENTS

| | | | |
|---|---|---|---|
| 6,735,550 B1 | 5/2004 | Weekley et al. | |
| 6,834,266 B2 | 12/2004 | Kumar et al. | |
| 2004/0102937 A1* | 5/2004 | Ibrahim | ........................... 703/2 |

OTHER PUBLICATIONS

Keogh, E., Lonardi, S. and Ratanamahatana, A., "Towards Parameter-free Data Mining", In Proc. of SIGKDD, 2004.
Vlachos, M., Meek, C., Vagena, Z., and Gunopulos, D., "Identification of Similarities, Periodicities & Bursts for Online Search Queries", In Proc. of SIGMOD, 2004.

* cited by examiner

*Primary Examiner* — Sujoy K Kundu
(74) *Attorney, Agent, or Firm* — Ference & Associates LLC

(57) ABSTRACT

Arrangements and methods for performing structural clustering between different time series. Time series data relating to a plurality of time series is accepted, structural features relating to the time series data are ascertained, and at least one distance between different time series via employing the structural features is determined. The different time series may be partitioned into clusters based on the at least one distance, and/or the k closest matches to a given time series query based on the at least one distance may be returned.

8 Claims, 18 Drawing Sheets

```
1  periods = getPeriodHints(Q)
2  {
3    k = 100;      // number of permutations
4    maxpower = {};  // empty set
5    periods = {};
6
7    for i = i to k
8    {
9      Qp = permute(Q);
10     P = getPeriodogram(Qp)
11
12     power = max(P.Power);
13     maxPower.add(power)
14   }
15
16   percentile = 99;
17   maxPower.sort;    // ascending
18   P_threshold = maxPower(maxPower.length*(percentile/100);
19
20   P = getPeriodogram(Qp);
21
22   for i = i to P.length
23   {
24     if (P[i].power > P_threshold)
25       periods.add(P);   // new candidate period
26   }
27
28   // period trimming
29   N = Q.length;
30   for i = i to periods.length
31   {
32     if (periods[i].hint >= N/2 || periods[i].hint <=2)
33       periods[i].erase();
34   }
35
36   return periods;
37 }
```

FIG. 5

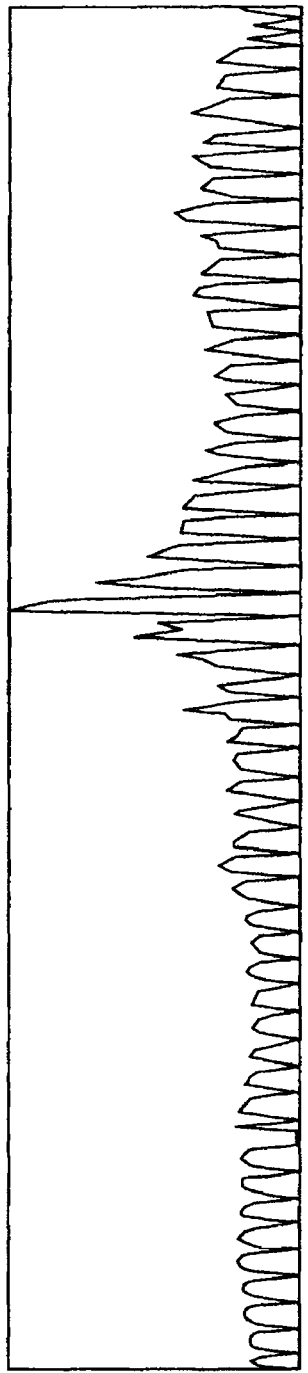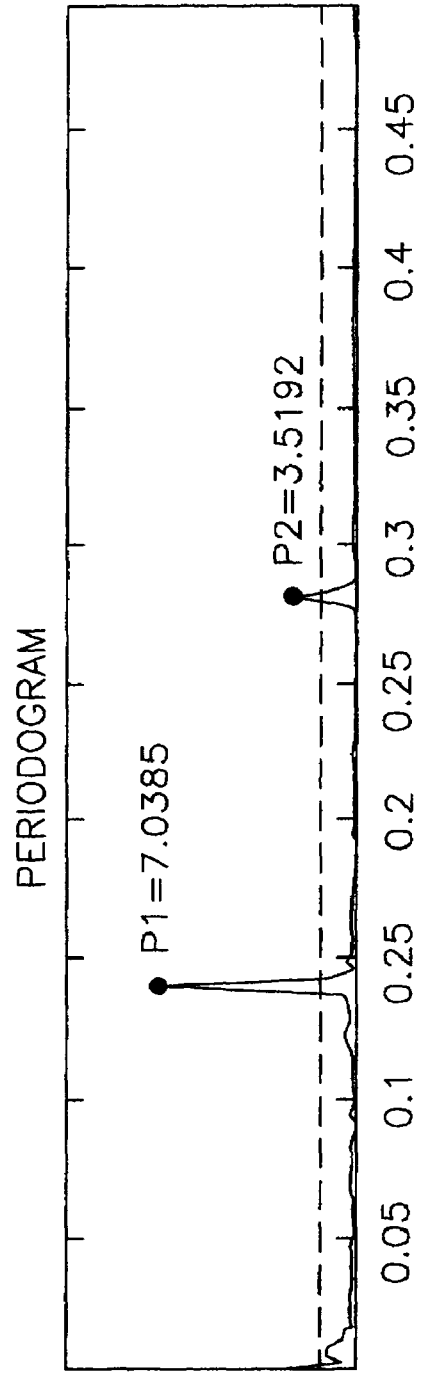
FIG. 6A

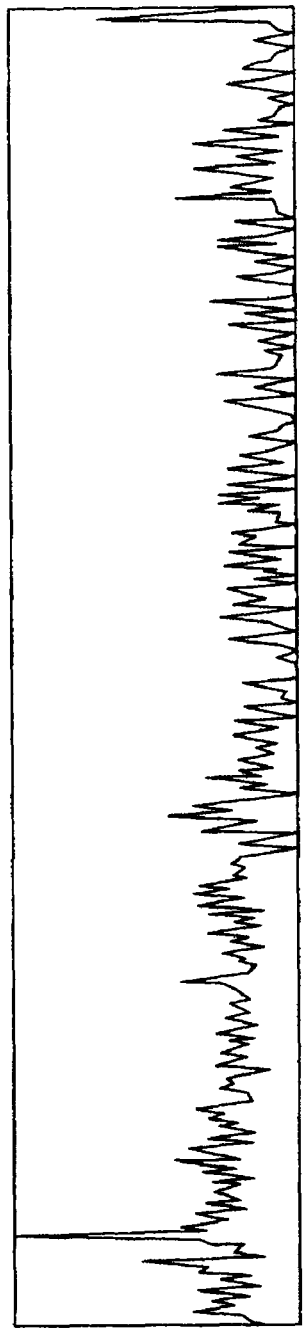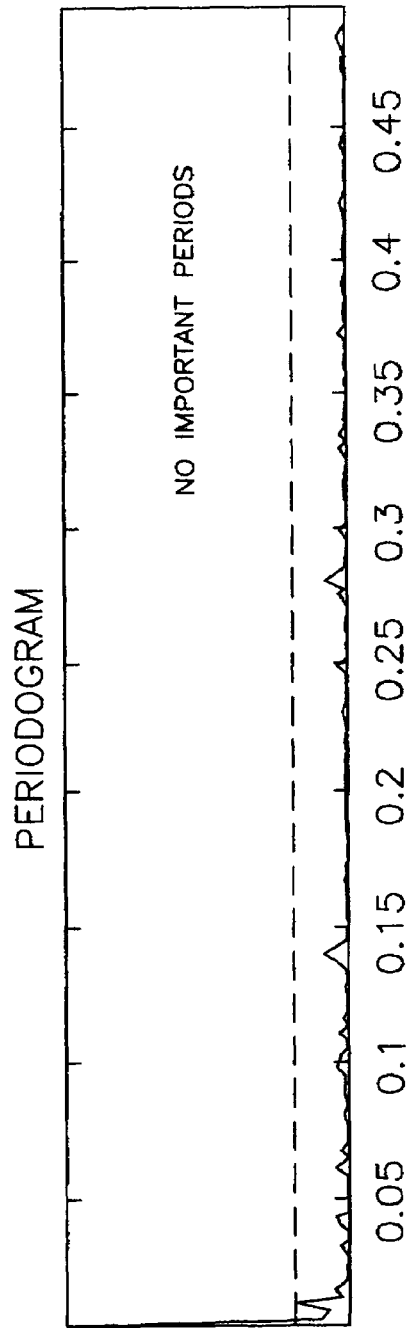
FIG. 6B

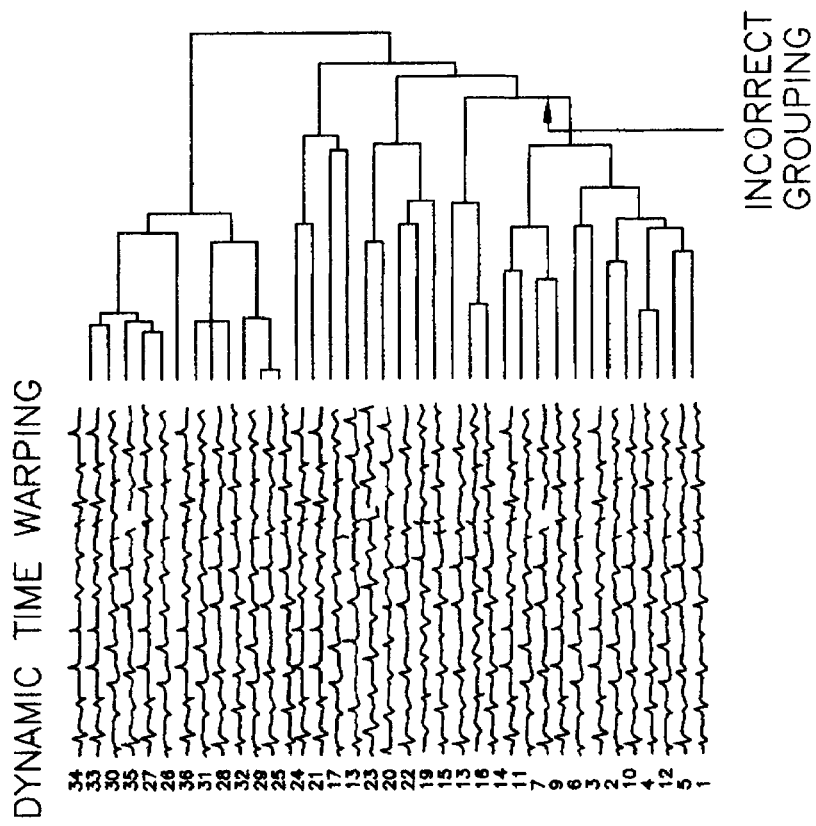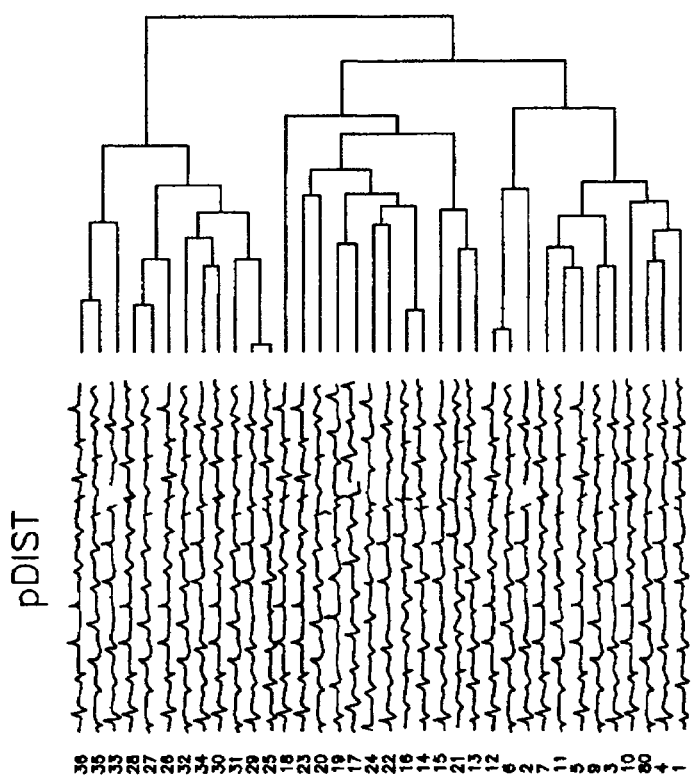
FIG. 14

SYSTEMS AND METHODS FOR STRUCTURAL CLUSTERING OF TIME SEQUENCES

CROSS REFERENCE TO RELATED APPLICATIONS

This application is a continuation application of U.S. patent application Ser. No. 12/115,824, filed May 6, 2008, now abandoned which is a counterpart to U.S. patent application Ser. No. 12/115,166, filed on May 5, 2008, both of which are continuation applications of and claim priority to U.S. patent application Ser. No. 11/096,485, filed Mar. 31, 2005 and issued as U.S. Pat. No. 7,369,961; the contents of all of these applications are hereby incorporated by reference as if set forth in their entirety.

This invention was made with Government support under Contract No.: H98230-04-3-001 awarded by the U.S. Department of Defense. The Government has certain rights in this invention.

BACKGROUND

The present invention generally relates to the management of data relating to time-series representations.

Herebelow, numerals set forth in square brackets—[ ]—are keyed to the list of references found towards the end of the present disclosure.

In recent years, in a constant effort to effect ongoing improvements in a crowded field of knowledge, there has been a profusion of time-series distance measures and representations. The majority of these attempts to characterize the similarity between sequences is based solely on shape. However, it is becoming increasingly apparent that structural similarities can provide more intuitive sequence characterizations that adhere more tightly to human perception of similarity.

While shape-based similarity methods seek to identify homomorphic sequences using original raw data, structure-based methodologies are designed to find latent similarities, possibly by transforming the sequences into a new domain, where the resemblance can be more apparent.

Generally, an evolving need has been recognized in connection with providing an ever more effective and efficient manner of managing time-series data.

BRIEF SUMMARY

Broadly contemplated herein, in accordance with at least one presently preferred embodiment of the present invention, are methods and arrangements considered for:

(i) efficiently capturing and characterizing (automatically) the periodicity of time-series;

(ii) characterizing the periodic similarity of time series; and (iii) combining the above methods to perform periodic clustering of time-series, where the periodicities of each cluster are also provided.

Techniques such as those outlined above can be applicable in a variety of disciplines, such as manufacturing, natural sciences and medicine, which acquire and record large amounts of periodic data. For the analysis of such data, first there is preferably employed accurate periodicity estimation, which can be utilized either for anomaly detection or for prediction purposes. Then, a structural distance measure can preferably be deployed that can effectively incorporate the periodicity for quantifying the degree of similarity between sequences. It is recognized that a periodic measure can allow for more meaningful and accurate clustering and classification, and can also be used for interactive exploration (and visualization) of massive periodic datasets.

In summary, one aspect of the invention provides a method of performing structural clustering between different time series, said method comprising the steps of: accepting time series data relating to a plurality of time series; ascertaining structural features relating to the time series data; determining at least one distance between different time series via employing the structural features; and partitioning the different time series into clusters based on the at least one distance.

Another aspect of the invention provides an apparatus for performing structural clustering between different time series, said apparatus comprising: an arrangement for accepting time series data relating to a plurality of time series; an arrangement for ascertaining structural features relating to the time series data; an arrangement for determining at least one distance between different time series via employing the structural features; and an arrangement for partitioning the different time series into clusters based on the at least one distance.

A further aspect of the invention provides a program storage device readable by machine, tangibly embodying a program of instructions executed by the machine to perform method steps for performing structural clustering between different time series, said method comprising the steps of: accepting time series data relating to a plurality of time series; ascertaining structural features relating to the time series data; determining at least one distance between different time series via employing the structural features; and partitioning the different time series into clusters based on the at least one distance.

Yet another aspect of the invention provides a method of quantifying the structural similarity between different time series, said method comprising the steps of: accepting time series data relating to a plurality of time series; ascertaining structural features relating to the time series data; determining at least one distance between different time series via employing the structural features; and returning the k closest matches to a given time series query based on the at least one distance.

A yet further aspect of the invention provides an apparatus for quantifying the structural similarity between different time series, said apparatus comprising: an arrangement for accepting time series data relating to a plurality of time series; an arrangement for ascertaining structural features relating to the time series data; an arrangement for determining at least one distance between different time series via employing the structural features; and an arrangement for returning the k closest matches to a given time series query based on the at least one distance.

Furthermore, an additional aspect of the invention provides a program storage device readable by machine, tangibly embodying a program of instructions executed by the machine to perform method steps for quantifying the structural similarity between different time series, said method comprising the steps of: accepting time series data relating to a plurality of time series; ascertaining structural features relating to the time series data; determining at least one distance between different time series via employing the structural features; and returning the k closest matches to a given time series query based on the at least one distance.

For a better understanding of the present invention, together with other and further features and advantages thereof, reference is made to the following description, taken in conjunction with the accompanying drawings, and the scope of the invention will be pointed out in the appended claims.

BRIEF DESCRIPTION OF THE SEVERAL VIEWS OF THE DRAWINGS

FIG. 5 depicts an algorithm, "getPeriodHints".

FIGS. 6(a) through 6(b) depict queries and corresponding periodograms.

FIG. 14 depicts correct grouping in a 3 class ECG problem.

DETAILED DESCRIPTION

By way of background, provided herebelow is a brief introduction to harmonic analysis using the discrete Fourier Transform, because these tools will be used as the building blocks of algorithms in accordance with at least one embodiment of the present invention.

The normalized Discrete Fourier Transform of a sequence $x(n)$, $n=0, 1 \ldots N-1$ is a sequence of complex numbers $X(f)$:

$$X(f_{k/N}) = \frac{1}{\sqrt{N}} \sum_{n=0}^{N-1} x(n) e^{-\frac{j2\pi kn}{N}},$$

$$k = 0, 1 \ldots N-1$$

where the subscript k/N denotes the frequency that each coefficient captures. Herethroughout there will also be utilized the notation $F(x)$ to describe the Fourier Transform. Since we are dealing with real signals, the Fourier coefficients are symmetric around the middle one (or to be more exact, they will be the complex conjugate of their symmetric). The Fourier transform represents the original signal as a linear combination of the complex sinusoids $$s_f(n) = \frac{e^{j2\pi fn/N}}{\sqrt{N}}.$$

Therefore, the Fourier coefficients record the amplitude and phase of these sinusoids, after signal x is projected on them.

One can return from the frequency domain back to the time domain, using the inverse Fourier transform $F^{-1}(x) = x(n)$:

$$x(n) = \frac{1}{\sqrt{N}} \sum_{n=0}^{N-1} X(f_{k/N}) e^{\frac{j2\pi kn}{N}},$$

$$k = 0, 1 \ldots N-1$$

Figure 1:
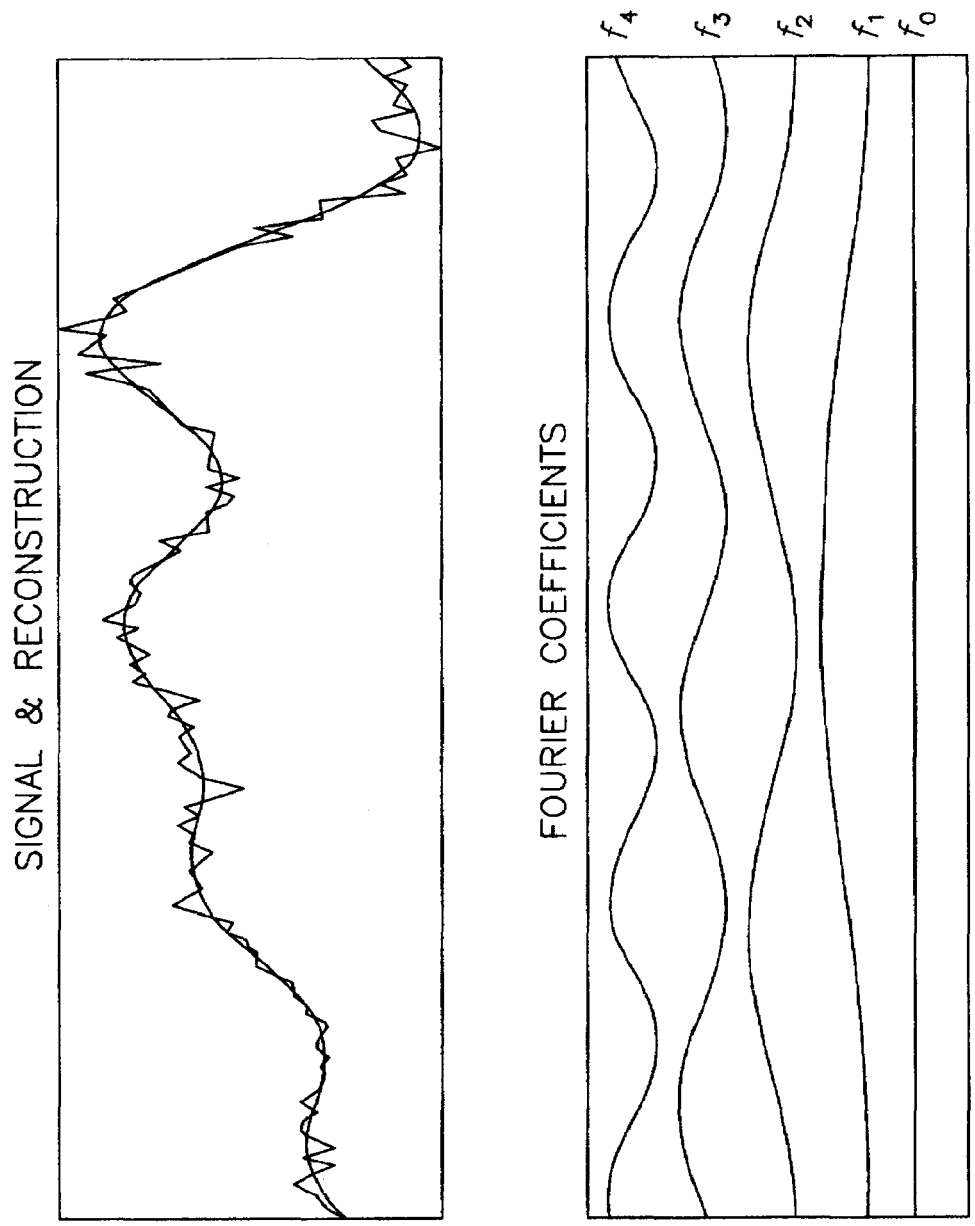
FIG. 1 depicts a reconstruction of a signal from Fourier coefficients.

Note that if during this reverse transformation one discards some of the coefficients (e.g., the last k), then the outcome will be an approximation of the original sequence (see FIG. 1). By carefully selecting which coefficients to record, one can perform a variety of tasks such as compression, denoising, etc.

In order to discover potential periodicities of a time-series, one needs to examine its power spectral density (PSD or power spectrum). The PSD essentially tells us how much is the expected signal power at each frequency of the signal. Since period is the inverse of frequency, by identifying the frequencies that carry most of the energy, we can also discover the most dominant periods. There are two well known estimators of the PSD; the periodogram and the circular autocorrelation. Both of these methods can be computed using the DFT of a sequence (and can therefore exploit the Fast Fourier Transform for execution in O(N log N) time).

Suppose that X is the DFT of a sequence x. The periodogram P is provided by the squared length of each Fourier coefficient:

$$P(f_{k/N}) = \|X(f_{k/N})\|^2$$

$$k = 0, 1 \ldots \left\lceil \frac{N}{2} \right\rceil$$

Where $\|.\|$ denotes the $L_2$ norm of a vector. Notice that one can only detect frequencies that are at most half of the maximum signal frequency, due to Nyquist's fundamental theorem. In order to find the k dominant periods, one should preferably pick the k largest values of the periodogram.

Each element of the periodogram provides the power at frequency k/N or, equivalently, at period N/k. Being more precise, each DFT 'bin' corresponds to a range of periods (or frequencies). That is, coefficient $X(f_{k/N})$ corresponds to periods $$\left[ \frac{N}{k} \ldots \frac{N}{k-1} \right).$$

It is easy to see that the resolution of the periodogram becomes very coarse for longer periods. For example, for a sequence of length N=256, the DFT bin margins will be N/1, N/2, N/3, . . . =256, 128, 64 etc.

Essentially, the accuracy of the discovered periods deteriorates for large periods, due to the increasing width of the DFT bins (N/k). Another related issue is spectral leakage, which causes frequencies that are not integer multiples of the DFT bin width, to disperse over the entire spectrum. This can lead to 'false alarms' in the periodogram. However, the periodogram can still provide an accurate indicator of important short (to medium) length periods. Additionally, through the periodogram it is easy to automate the extraction of important periods (peaks) by examining the statistical properties of the Fourier coefficients.

The second way to estimate the dominant periods of a time-series x, is to calculate the circular AutoCorrelation Function (or ACF), which examines how similar a sequence is to its previous values for different τ lags:

$$ACF(\tau) = \frac{1}{N}\sum_{n=0}^{N-1} x(\tau) \cdot x(n+\tau)$$

where the sum in n+τ is modulo N.

Therefore, the autocorrelation is formally a convolution, and one can avoid the quadratic calculation in the time domain by computing it efficiently as a dot product in the frequency domain using the normalized Fourier transform:

$$ACF = F^{-1} \langle X, X^* \rangle$$

The star (*) symbol denotes complex conjugation.

The ACF provides a more fine-grained periodicity detector than the periodogram, hence it can pinpoint with greater accuracy even larger periods. However, it is not sufficient by itself for automatic periodicity discovery for the following reasons:

1. Automated discovery of important peaks is more difficult than in the periodogram, because the user must set a significance threshold.
2. Even if the user picks the level of significance, multiples of the same basic period also appear as peaks. Therefore, the method introduces many false alarms that need to be eliminated in a post-processing phase.
3. Low amplitude events of high frequency may appear less important (i.e., have lower peaks) than high amplitude patterns, which nonetheless appear more scarcely (see FIG. 2).

Figure 2:
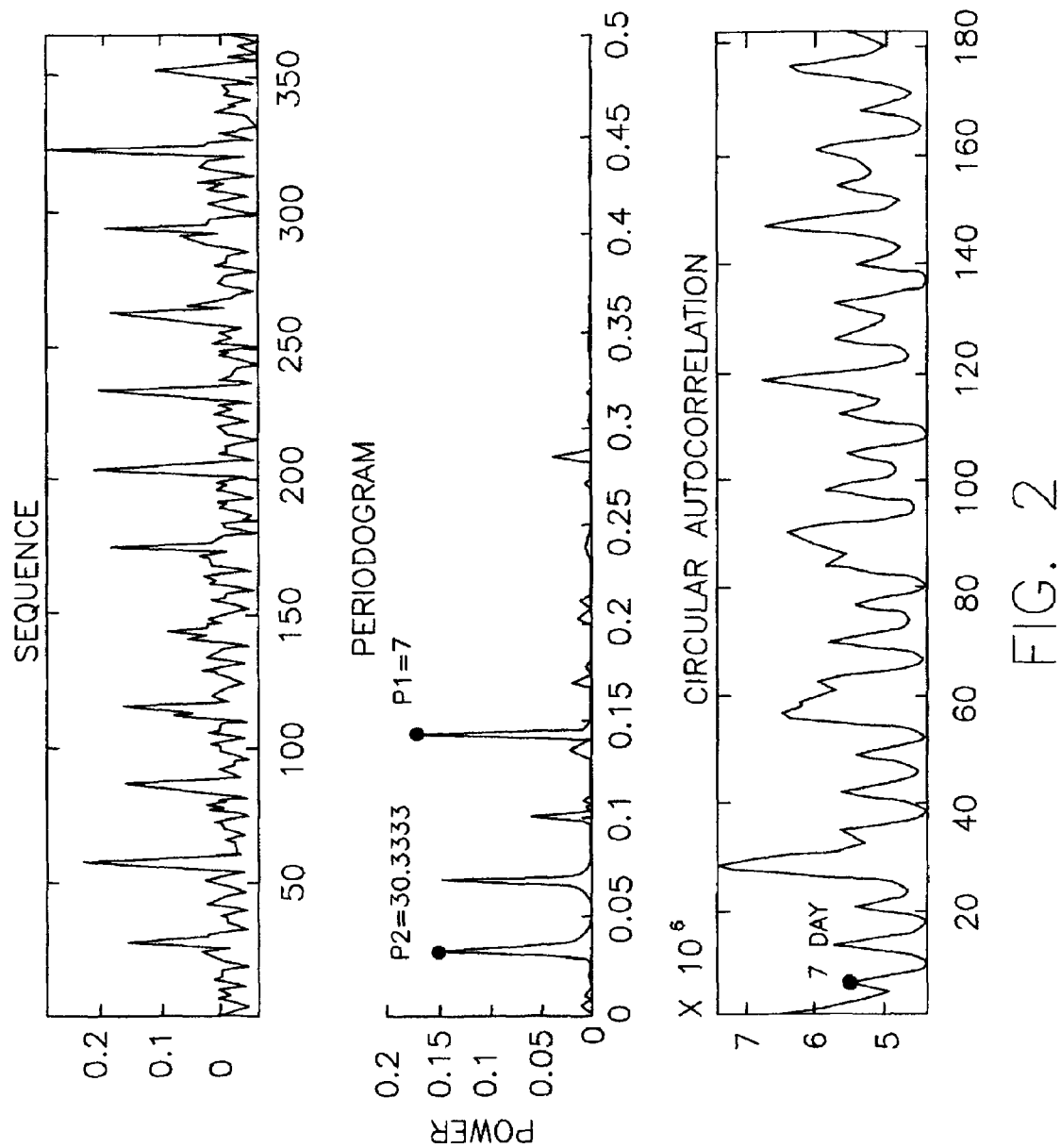
FIG. 2 depicts a sequence and a corresponding periodogram and autocorrelation graph.

With relation to FIG. 2, the 7 day period is latent in the autocorrelation graph, because it has lower amplitude (even though it happens with higher frequency). However, the 7 day peak is very clear in the Periodogram.

The advantages and shortcomings of the periodogram and the ACF are summarized in Table 1.

From the above discussion one can realize that although the periodogram and the autocorrelation cannot provide sufficient spectral information separately, there is a lot of potential when both methods are combined. An approach in accordance with at least one preferred embodiment of the present invention is delineated in the following section.

In accordance with at least one preferred embodiment of the present invention, there is preferably utilized a two-tier approach, by considering the information in both the autocorrelation and the periodogram. One may call this method AUTOPERIOD. Since the discovery of important periods is more difficult on the autocorrelation, one can use the periodogram for extracting period candidates. The period candidates may be termed 'hints'. These 'hints' may be false (due to spectral leakage), or provide a coarse estimate of the period (remember that DFT bins increase gradually in size); therefore a verification phase using the autocorrelation is required, since it provides a more fine-grained estimation of potential periodicities. The intuition is that if the candidate period from the periodogram lies on a hill of the ACF then one can consider it as a valid period, otherwise one may preferably discard it as false alarm. For the periods that reside on a hill, further refinement may be required if the periodicity hint refers to a large period.

Figure 3:
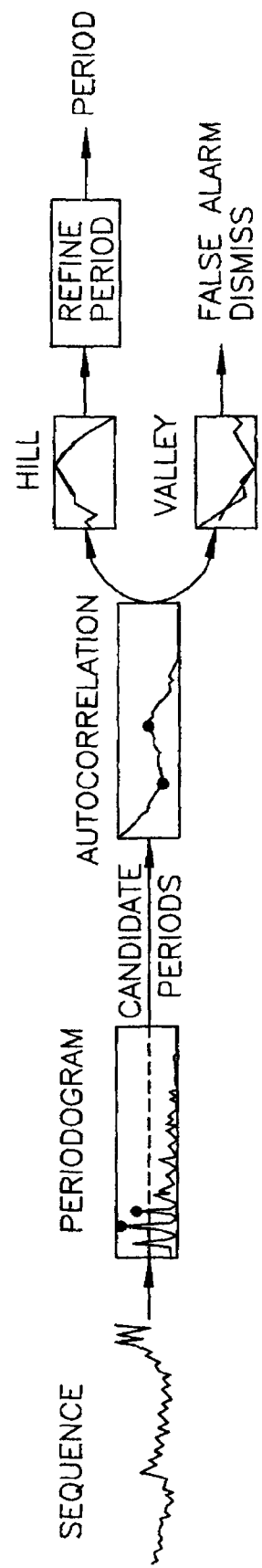
FIG. 3 schematically depicts an "autoperiod" methodology.
Figure 4:
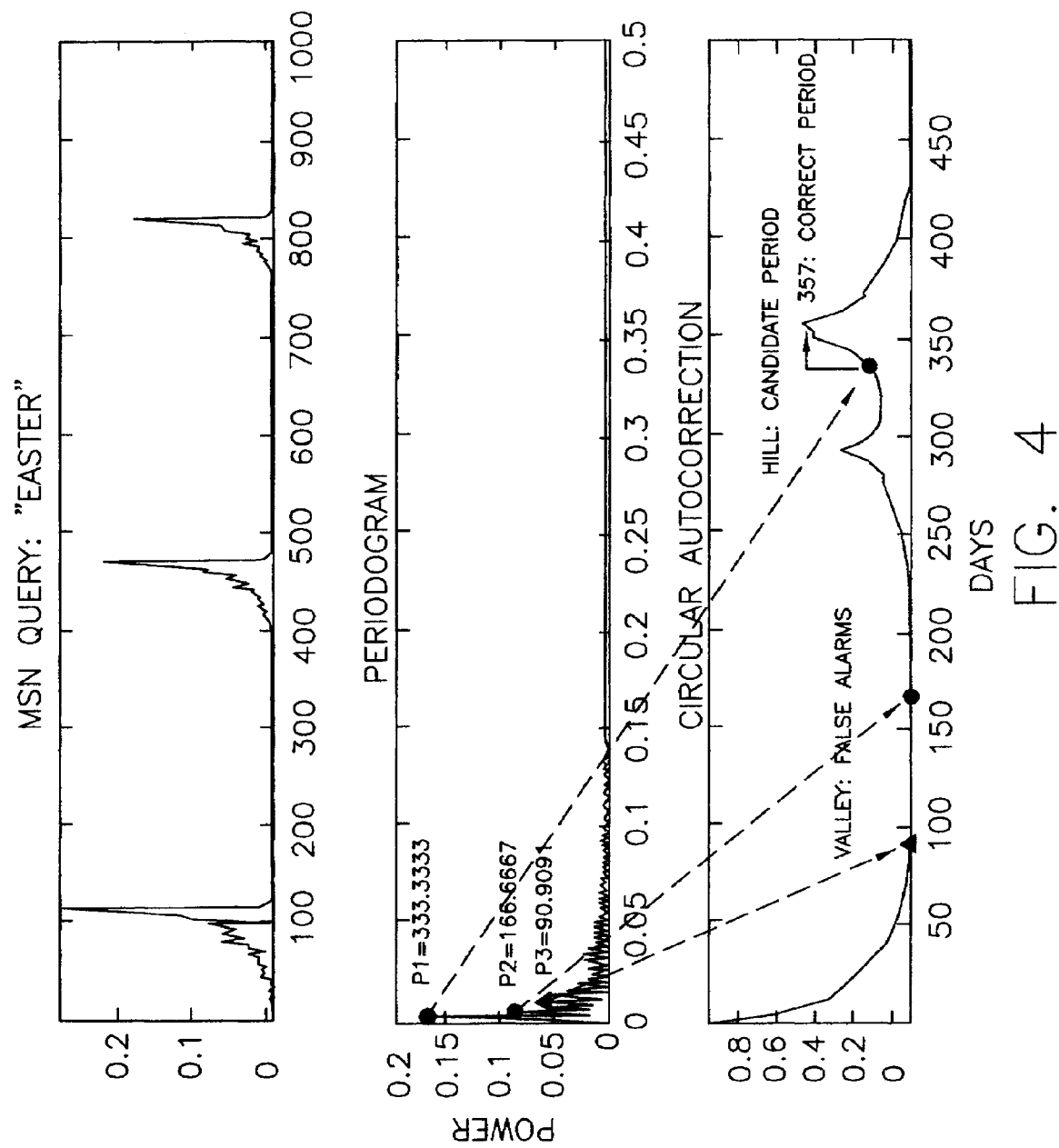
FIG. 4 provides a graphical demonstration of the method of FIG. 3.
Figure 7:
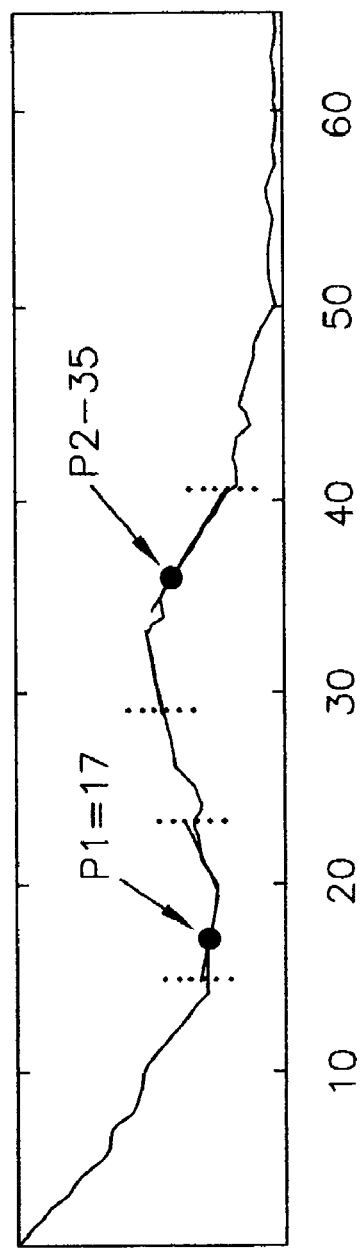
FIG. 7 depicts a segmentation of autocorrelation intervals.
Figure 8A:
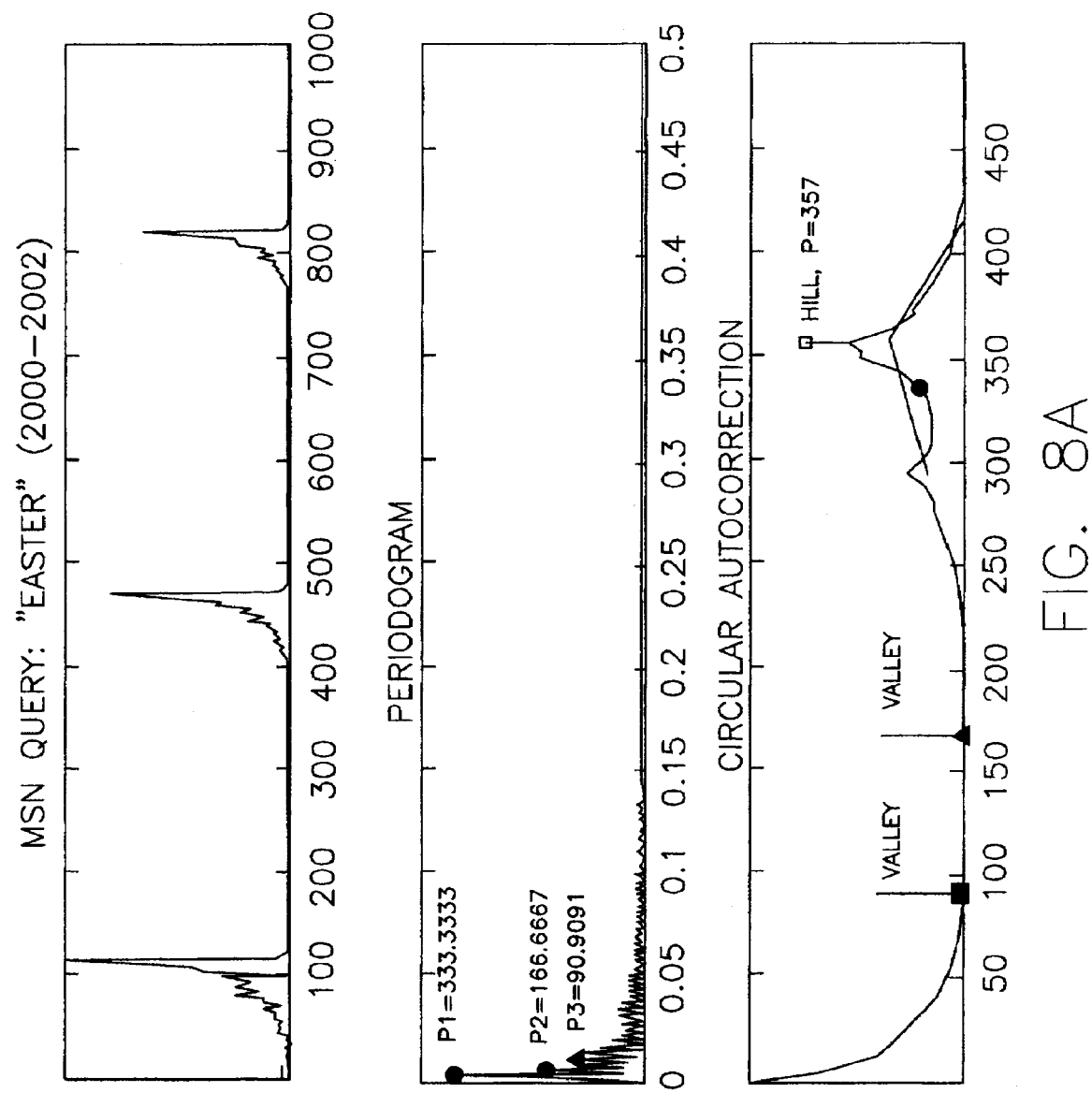
FIGS. 8(a) through 8(d) depict periodicity detection results of the "autoperiod" method.
Figure 8B:
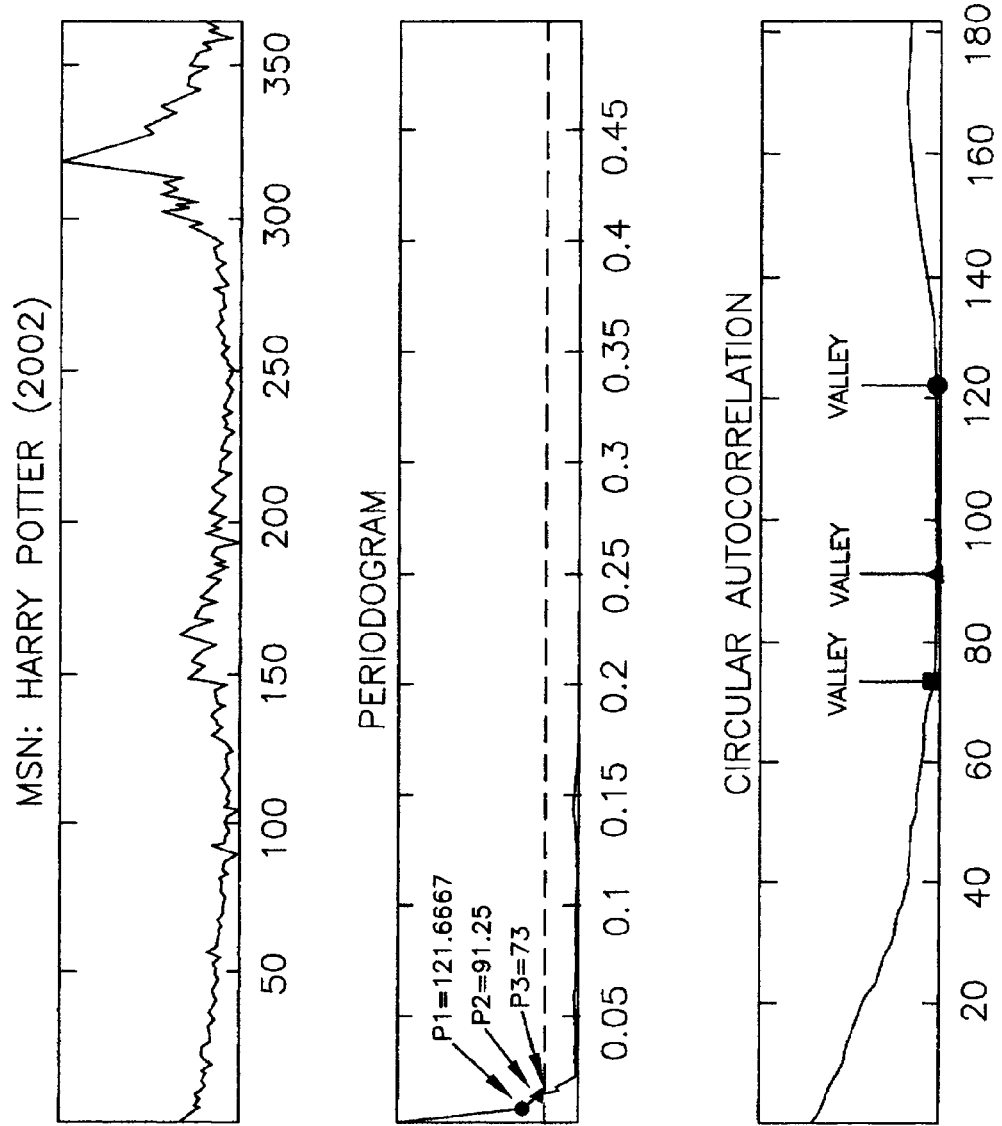
Figure 8C:
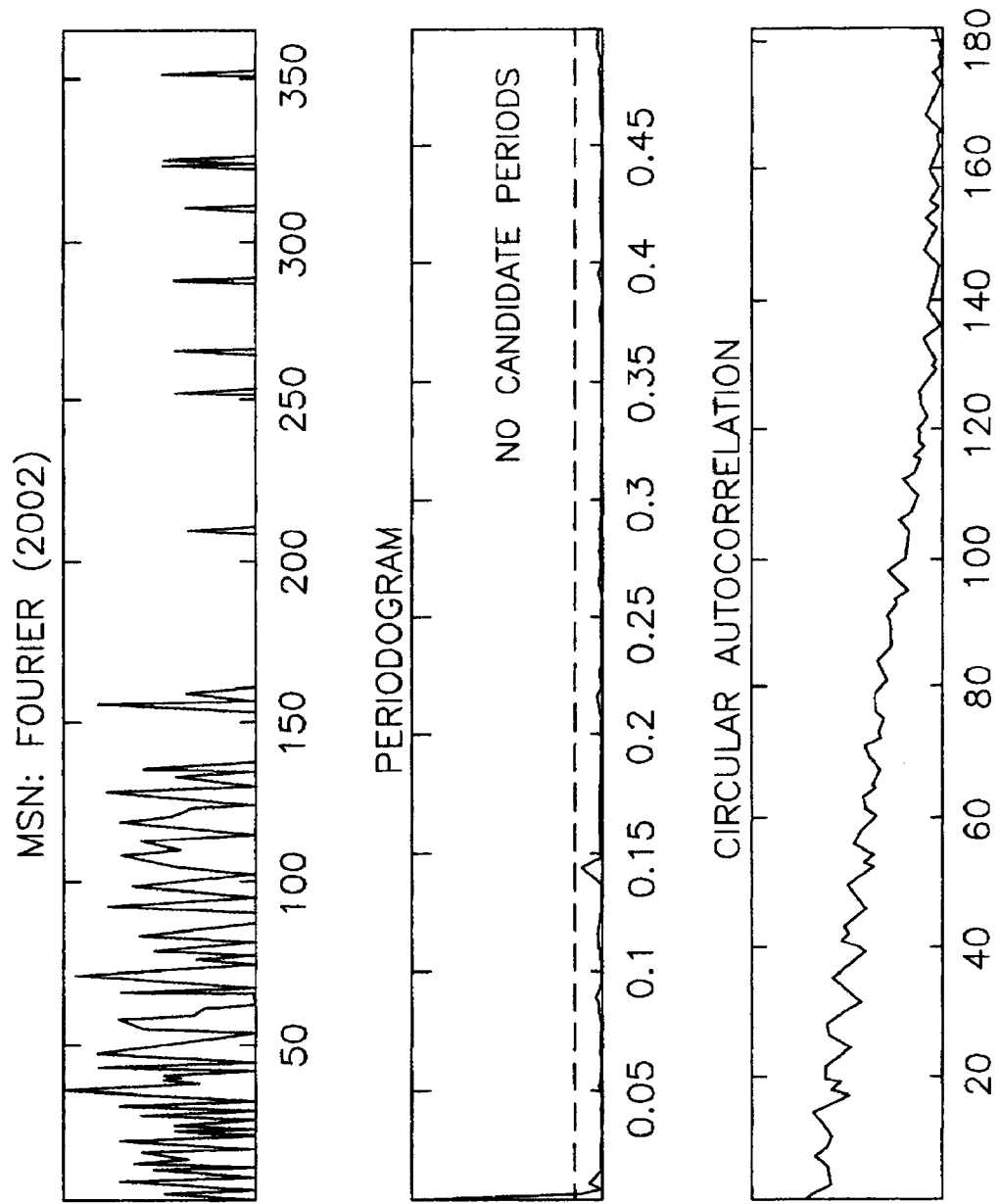
Figure 8D:
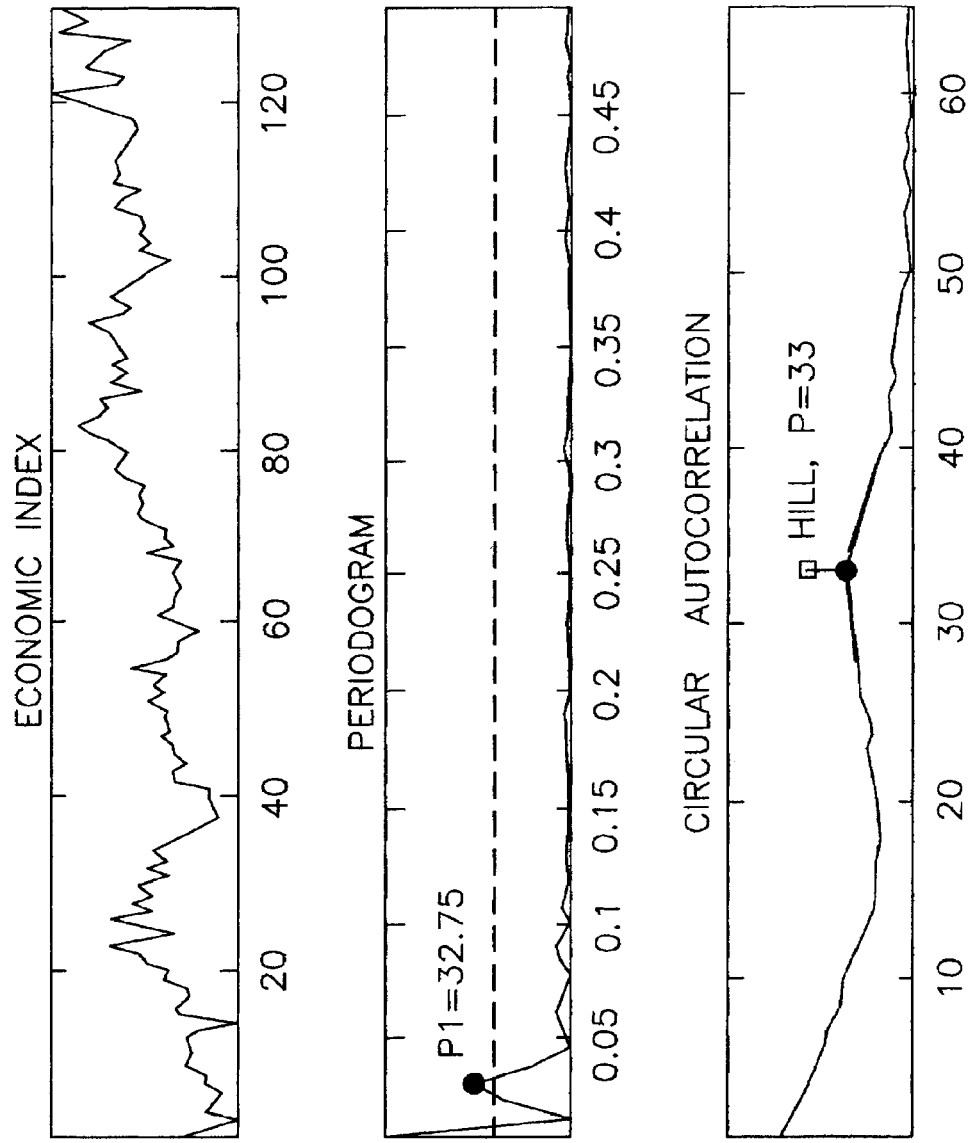

FIG. 3 summarizes a methodology in accordance with at least one embodiment of the present invention and FIG. 4 depicts the visual intuition behind such an approach with a working example. The sequence is obtained from the MSN query request logs and represents the aggregate demand for the query 'Easter' for 1000 days after the beginning of 2002. The demand for the specific query peaks during Easter time and one can observe one yearly peak. The intuition is that periodicity should be approximately 365 (although not exactly, since Easter is not celebrated at the same date every year). Indeed the most dominant periodogram estimate is 333.33 (1000/3), which is located on a hill of the ACF, with a peak at 357 (the correct periodicity—at least for this 3 year span). The remaining periodic hints can be discarded upon verification with the autocorrelation.

FIG. 4 provides a visual demonstration a method carried out in accordance with an embodiment of the present invention. Candidate periods from the periodogram are verified against the autocorrelation. Valid periods are further refined utilizing the autocorrelation information.

Essentially, there has been leveraged the information of both metrics for providing an accurate periodicity detector. In addition, methods carried out in accordance with at least one embodiment of the present invention are computationally efficient, because both the periodogram and the ACF can be directly computed through the Fast Fourier Transform of the examined sequence in O(N log N) time.

For extracting a set of candidate periodicities from the periodogram, one needs to determine an appropriate power threshold that should distinguish only the dominant frequencies (or inversely the dominant periods). If none of the sequence frequencies exceeds the specific threshold (i.e., the set of periodicity 'hints' is empty), then one can regard the sequence as non-periodic.

In order to specify which periods are important, one should first preferably identify how much of the signal energy is attributed to random mechanisms, that is, everything that could not have been attributed to a random process should be of interest.

Let us assume that one examines a sequence x. The outcome of a permutation on the elements of x is a sequence x̃. The new sequence will retain the first order statistics of the original sequence, but will not exhibit any pattern or periodicities, because of the 'scrambling' process (even though such characteristics may have existed in sequence x). Anything that has the structure of x̃ is not interesting and should be discarded, therefore at this step one can record the maximum power ($p_{max}$) that x̃ exhibits, at any frequency f.

$$p_{max} = \arg\max_f \|\tilde{x}(f)\|^2$$

Only if a frequency of x has more power than $p_{max}$ can be considered interesting. If one would like to provide a 99% confidence interval on what frequencies are important, one should repeat the above experiment 100 times and record for each one the maximum power of the permuted sequence x̃. The 99$^{th}$ largest value of these 100 experiments, will provide a sufficient estimator of the power threshold $p_T$ being sought. Periods (in the original sequence periodogram) whose power is more than the derived threshold will be considered:

$$P_{hint}\{N/k : P(f_{k/N}) > p_T\}$$

Finally, an additional period 'trimming' should be performed for discarding periods that are either too large or too small and therefore cannot be considered reliable. In this phase any periodic hint greater than N/2 or smaller than 2 is removed.

FIG. 5 captures a pseudo-code of the algorithm for identifying periodic hints.

In [2] another algorithm for detection of important periods was proposed, which follows a different concept for estimating the periodogram threshold. The assumption there was that the periodogram of non-periodic time-series will follow an exponential distribution, which returned very intuitive period estimates for real world datasets. In experimentation, it has been found that the two algorithms return very comparable threshold values. However, because the new method does not make any assumptions about the underlying distribution, it can be applicable for a wider variety of time-series processes.

By way of concrete examples, there were employed sequences from the MSN query logs (yearly span) to demonstrate the usefulness of the discovered periodic hints. In FIG. 6(a) there is presented the demand of the query 'stock market', where one can distinguish a strong weekly component in the periodogram. FIG. 6(b) depicts the query 'weekend' which does not contain any obvious periodicities. A method in accordance with at least one embodiment of the present invention can set the threshold high enough, therefore avoiding false alarms.

TABLE 1

Concise comparison of approaches for periodicity detection.

| Method | Easy to threshold | Accurate short periods | Accurate Large Periods | Complexity |
|---|---|---|---|---|
| Periodogram | Yes | yes | no | O(NlogN) |
| Autocorrelation | No | yes | yes | O(NlogN) |
| Combination | Yes | yes | yes | O(NlogN) |

After the periodogram peaks have been identified, there has been obtained a candidate set of periodicities for the examined sequence. The validity of these periods will be verified against the autocorrelation. An indication that a period is important, can be the fact that the corresponding period lies on a hill of the autocorrelation. If the period resides on a valley then it can be considered spurious and therefore safely discarded.

After discovering that a periodicity 'hint' resides on a hill of the autocorrelation, one can refine it even further by identifying the closest peak (i.e., local maximum). This is a necessary step, because the correct periodicity (i.e., peak of the hill) might not have been discovered by the periodogram, if it was derived from a 'wide' DFT bin. This is generally true for larger periods, where the resolution of the DFT bins drops significantly. Below is a discussion of how to address such issues.

The significance of a candidate period ideally can be determined by examining the curvature of the ACF around the candidate period p. The autocorrelation is concave downward, if the second derivative is negative in an open interval (a ... b):

$$\frac{\partial^2 ACF(x)}{\partial x^2} < 0, \text{ for all } x \in (a \ldots b), a < p < b$$

Nevertheless, small perturbations of the ACF due to the existence of noise, may invalidate the above requirement. There will be sought a more robust estimator of the curvature by approximating the ACF in the proximity of the candidate period with two linear segments. Then it is sufficient to examine if the approximating segments exhibit an upward-downward trend, for identifying a concave downward pattern (i.e., a hill).

The segmentation of a sequence of length N into k linear segments can be computed optimally using a dynamic programming algorithm in $O(N^2 k)$ time, while a greedy merge algorithm achieves results very close to optimal in $O(N \log N)$ time. For this problem instance, however, one can employ a simpler algorithm, because only a two segment approximation for a specific portion of the ACF is required.

Let $\hat{S}_a^b$ be the linear regression of a sequence x between the positions [a ... b] and $$\varepsilon(\hat{S}_a^b)$$

be the error introduced by the approximating segment. The best split position $t_{split}$ is derived from the configuration that minimizes the total approximation error:

$$t_{split} = \arg\min_t \varepsilon(\hat{S}_1^t) + \varepsilon(\hat{S}_{t+1}^n)$$

After it has been ascertained that a candidate period belongs on a hill and not on a valley of the ACF, there is a need to discover the closest peak which will return a more accurate estimate of the periodicity hint (particularly for larger periods). One can proceed in two ways; the first one would be to perform any hill-climbing technique, such as gradient ascent, for discovering the local maximum. In this manner the local search will be directed toward the positive direction of the first derivative. Alternatively, one could derive the peak position directly from the linear segmentation of the ACF, which is already computed in the hill detection phase. The peak should be located either at the end of the first segment or at the beginning of the second segment.

Both methods have been implemented for the purpose of experimentation and it has been found that both report accurate results.

Several sequences from the MSN query logs were employed to perform convincing experiments regarding the accuracy of a 2-tier methodology in accordance with at least one embodiment of the present invention. The specific dataset is ideal for the present purposes because one can detect a number of different periodicities according to the demand pattern of each query.

The examples in FIG. 8 demonstrate a variety of situations that might occur when using both the periodogram and autocorrelation.

Query 'Easter' (MSN): Examining the demand for a period of 1000 days, one can discover several periodic hints above the power threshold in the periodogram. In this example, the autocorrelation information refines the original periodogram hint (from 333→357). Additional hints are rejected because they reside on ACF valleys (in the figure only the top 3 candidate periods are displayed for reasons of clarity).

Query 'Harry Potter' (MSN): For the specific query although there are no observed periodicities (duration 365 days), the periodogram returns 3 periodic hints, which are mostly attributed to the burst pattern during November when the movie was released. The hints are classified as spurious upon verification with ACF.

Query 'Fourier' (MSN): This is an example where the periodogram threshold effectively does not return candidate periods. Notice that if one had utilized only the autocorrelation information, it would have been more troublesome to discover which (if any) periods were important. This represents another validation that the choice to perform the period thresholding in the frequency space was correct.

Economic Index (Stock Market): Finally, this last sequence from a stock market index illustrates a case where both the periodogram and autocorrelation information concur on the single (albeit weak) periodicity.

Through this experimental testbed it has been demonstrated that AUTOPERIOD can provide very accurate periodicity estimates without upsampling the original sequence. In the sections that follow, it will be shown how it can be used in conjunction with periodic similarity measures, for interactive exploration of sequence databases.

Structural measures can preferably be introduced that are based on periodic features extracted from sequences. Periodic distance measures can be used for providing more meaningful structural clustering and visualization of sequences (whether they are periodic or not). After sequences are grouped in 'periodic' clusters, using a 'drill-down' process the user can selectively apply the AUTOPERIOD method for periodicity estimation on the sequences or clusters of interest. In the discussion of experimentation examples of this methodology using hierarchical clustering trees are provided.

Figure 9:
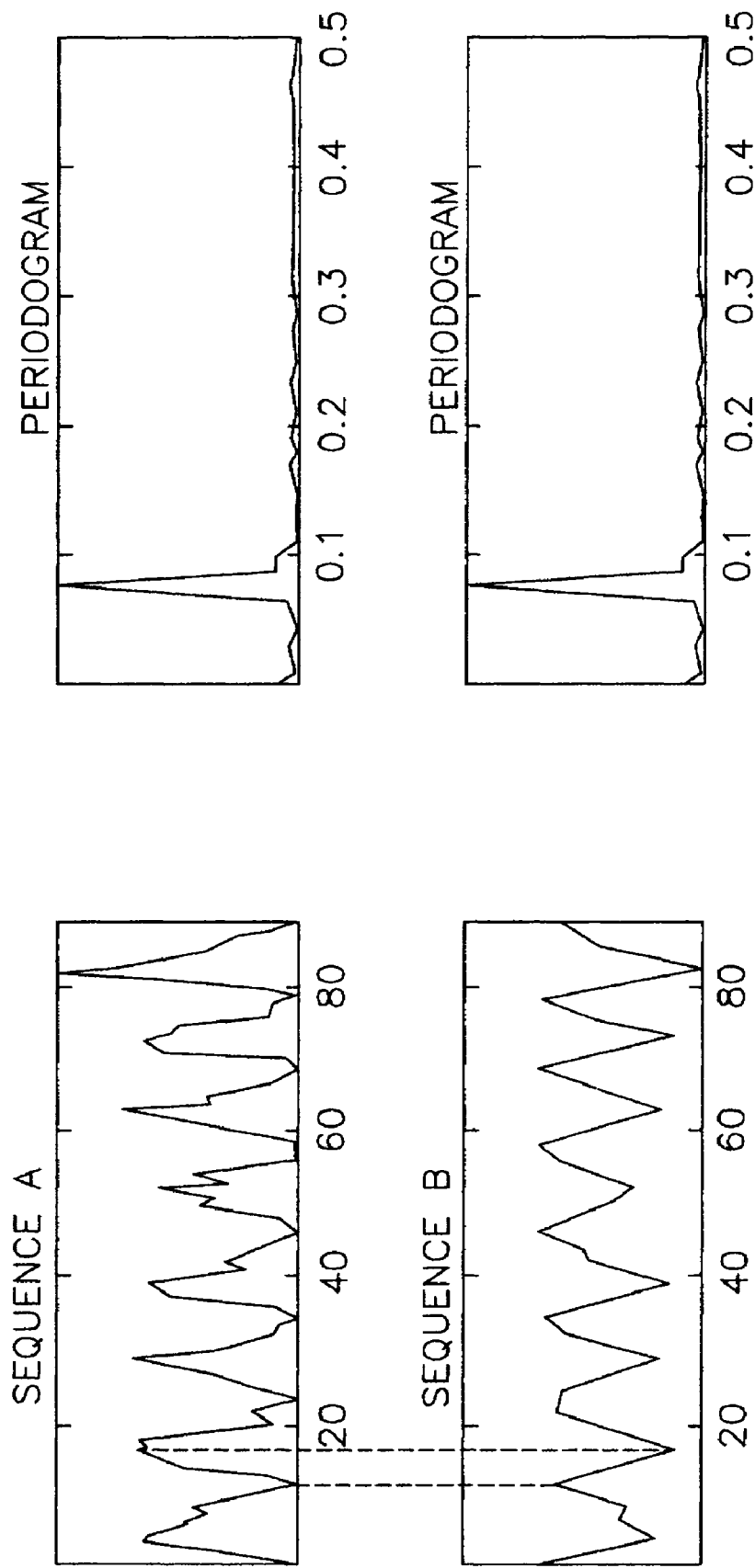
FIG. 9 provides a comparison between two time-series.

Let us consider first the utility of periodic distance measures with an example. Suppose that one is examining the similarity between the two time-series of FIG. 9. When sequence A exhibits an upward trend, sequence B displays a downward drift. Clearly, the Euclidean distance (or inner product) between sequences A and B, will characterize them as very different. However, if one exploits the frequency content of the sequences and evaluates their periodogram, one will discover that it is almost identical. In this new space, the Euclidean distance can easily identify the sequence similarities. Even though this specific example could have been addressed in the original space using the Dynamic Time Warping (DTW) distance, it should be noted that the methods broadly contemplated herein are significantly more efficient (in terms of both time and space) than DTW. Additionally, periodic measures can address more subtle similarities that DTW cannot capture, such as different patterns/shapes occurring at periodic (possibly non-aligned) intervals. Herebelow, there will be examined cases where the DTW fails.

The new measure of structural similarity presented herein exploits the power content of only the most dominant periods/frequencies. By considering the most powerful frequencies, the present method concentrates on the most important structural characteristics, effectively filtering out the negative influence of noise, and eventually allowing for expedited distance computation. Additionally, the omission of the phase information renders the new similarity measure shift invariant in the time domain. One can therefore discover time-series with similar patterns, which may occur at different chronological instants.

For comparing the periodic structure of two sequences, one should preferably examine how different is their harmonic content. One may achieve this by utilizing the periodogram and specifically the frequencies with the highest energy.

Suppose that X is the Fourier transform of a sequence x with length n. One can discover the k largest coefficients of X by computing its periodogram P(X) and recording the position of the k frequencies with the highest power content (parameter k depends on the desired compression factor). Let us denote the vector holding the positions of the coefficients with the largest power $p^+$ (so $p^+ \subset [1 \ldots n]$). To compare x with any other sequence q, one needs to examine how similar energies they carry in the dominant periods of x. Therefore, one preferably evaluates $P(Q(p^+))$, that describes a sequence holding the equivalent coefficients as the vector $P(X(p^+))$. The distance pDist between these two vectors captures the periodic similarity between sequences x and q:

$$p\text{Dist}=\|P(Q(p^+))-P(X(p^+))\|$$

Example: Let x and q be two sequences and let their respective Fourier Transforms be X={(1+2i),(2+2i),(1+i),(5+1)} and Q={(2+2i),(1+i),(3+i),(1+2i)}. The periodogram vector of X is: $P(X)=\|X\|^2=(5,8,2,26)$. The vector holding the positions of X with highest energy is $p^+=(2,4)$ and therefore $P(X(p^+))=(0,8,0,26)$. Finally, since $P(Q)=(8,2,10,5)$ it follows that: $P(Q(p^+))=(0,2,0,5)^1$.

Alternatively, if one doesn't want to provide a parameter k, one could extract from a sequence those periodic features that retain e % of the signal energy, or use the algorithm from the periodicity detection to extract the most important periods of a sequence.

In order to meaningfully compare the power content of two sequences one should preferably normalize them, so that they contain the same amount of total energy. One can assign to any sequence x(n) unit power, by performing the following normalization:

$$\hat{x}(n) = \frac{x(n) - \frac{1}{N}\sum_{i=1}^{N} x(i)}{\sqrt{\sum_{i=1}^{N}\left(x(n) - \frac{1}{N}\sum_{i=1}^{N} x(i)\right)^2}}$$

The above transformation will lead to zero mean value and sum of squared values equal to 1. Parseval's theorem dictates that the energy in the time domain equals the energy in the frequency domain, therefore the total energy in the frequency domain should also be unit:

$$\|\hat{x}\|^2=\|F(\hat{x})\|^1=1$$

After this normalization, one can more meaningfully compare the periodogram energies.

Presented herein are the results of extensive experimentation that show the usefulness of the new periodic measures, and the measures are compared with widely used shape based measures or newly introduced structural distance measures.

Figure 10:
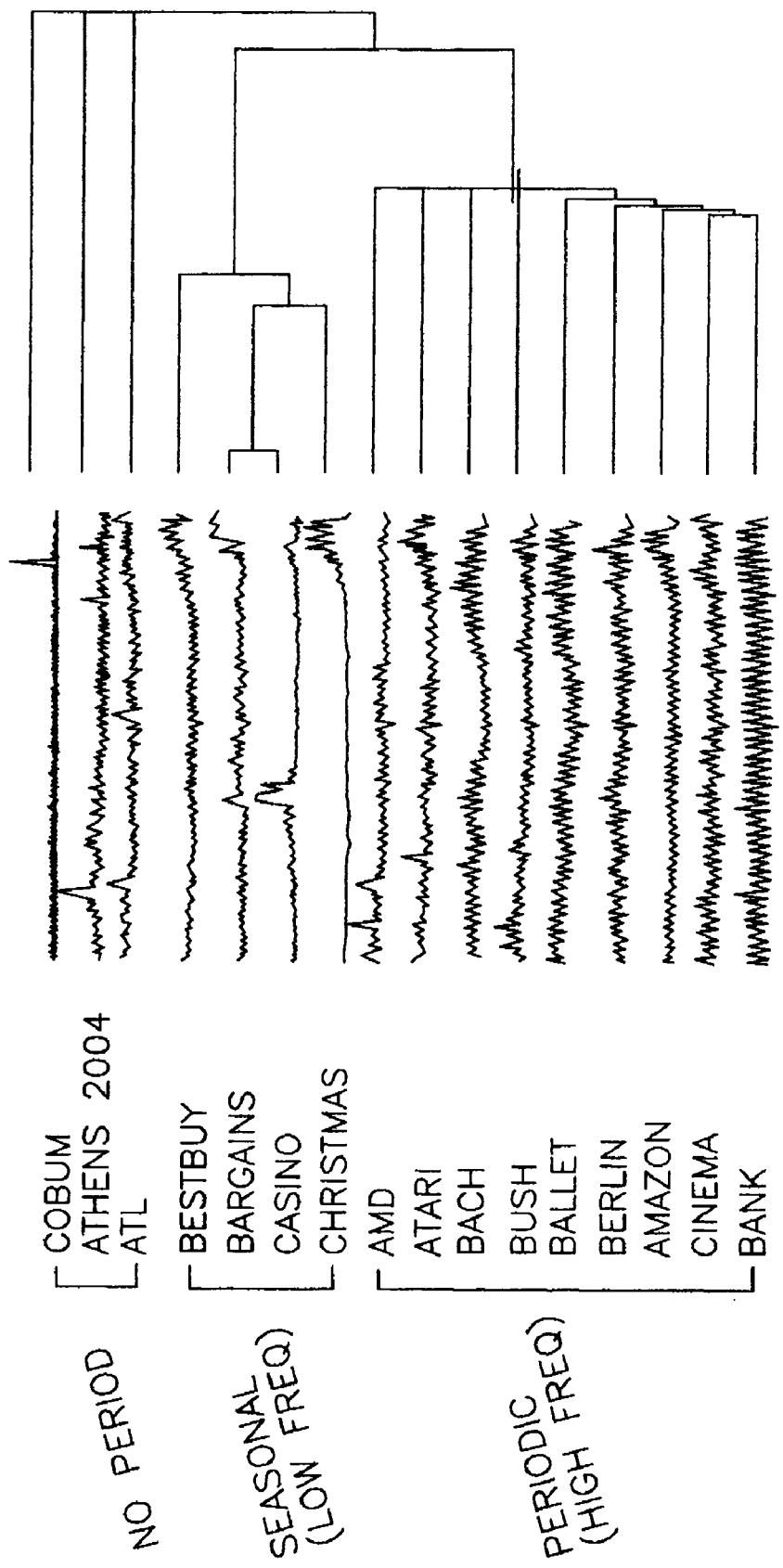
FIG. 10 depicts a dendrogram based on historical features.

Using 16 sequences which record the yearly demand of several keywords at the MSN search engine, one may preferably perform the hierarchical clustering which is shown in FIG. 10. In the dendrogram derived using the p Di s t as the distance function, one can notice a distinct separation of the sequences/keywords into 3 classes. The first class contains no clear periodicities (no specific pattern in the demand of the query), while the second one exhibits only bursty seasonal trends (e.g., during Christmas). The final category of queries are requested with high frequency (weekly period) and here one can find keywords such as 'cinema', 'bank', 'Bush' etc.

Figure 11:
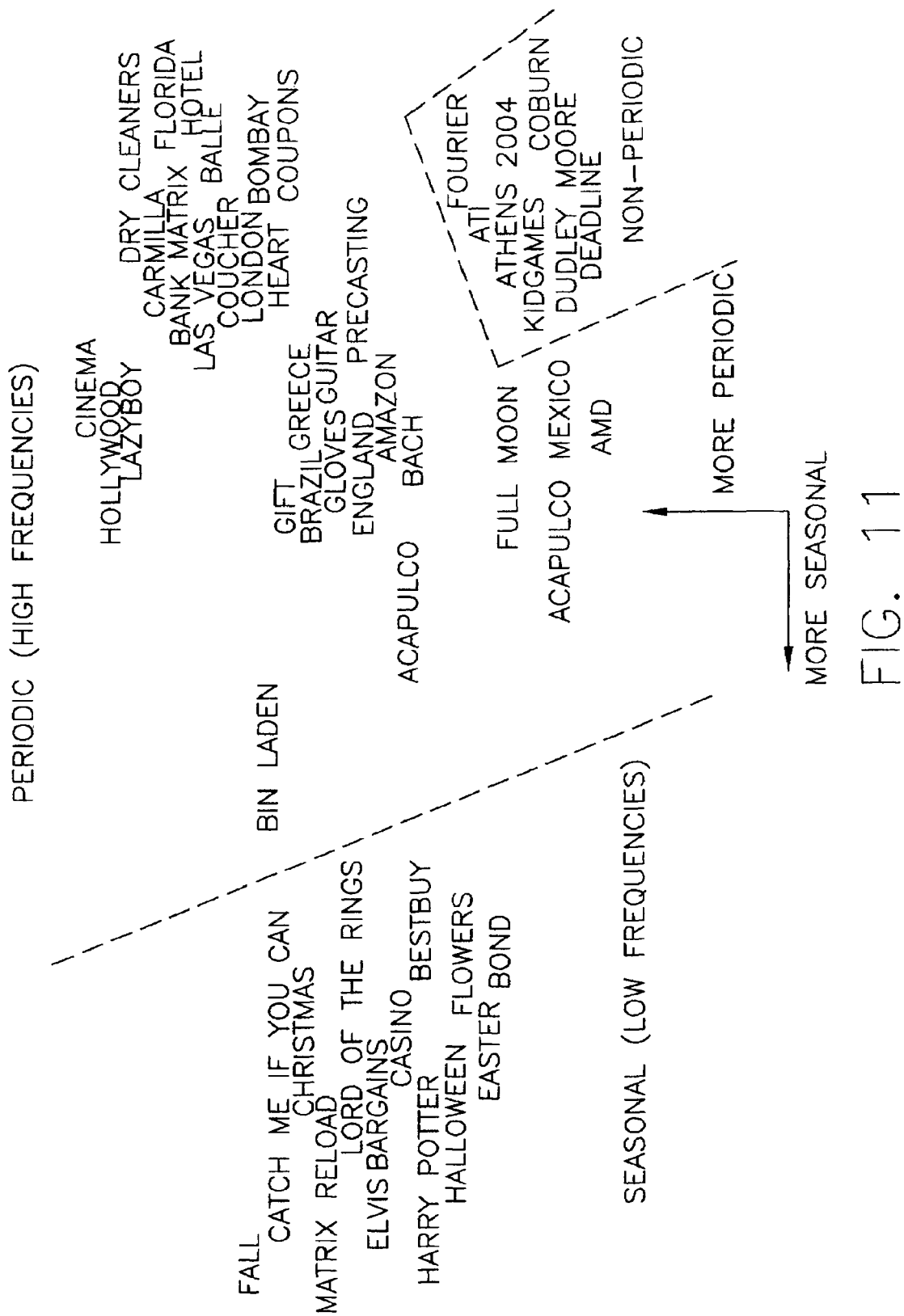
FIG. 11 depicts a two-dimensional mapping of pairwise distances between different sequences.

One can utilize an extended portion of the same dataset for exploring the visualization power of periodic distance measures. Using the pairwise distance matrix between a set of MSN keyword demand sequences (365 values, year 2002), there is evaluated a 2D mapping of the keywords using Multidimensional Scaling (FIG. 11). The derived mapping shows the high discriminatory efficacy of the pDist measure; seasonal trends (low frequencies) are disjoint from periodic patterns (high frequencies), allowing for a more structural sequence exploration. Keywords like 'fall', 'Christmas', 'lord of the rings', 'Elvis', etc., manifest mainly seasonal bursts, which need not be aligned in the time axis. On the contrary, queries like 'dry cleaners' or 'Friday' indicate a natural weekly repeated demand. Finally, some queries do not exhibit any obvious periodicities within a year's time (e.g., 'icdm', 'kdd', etc).

For a second experiment there is employed a combination of periodic time series that are collected from natural sciences, medicine and manufacturing, augmented by pairs of random noise and random walk data.

All datasets come in pairs, hence, when performing a hierarchical clustering algorithm on this dataset, one expects to find a direct linkage of each sequence pair at the lower level of the dendrogram. If this happens one may consider the clustering to be correct. The dataset is made up of 12 pairs, therefore a measure of the clustering accuracy can be the number of correct pair likings, over twelve, the number of total pairs.

Figure 12:
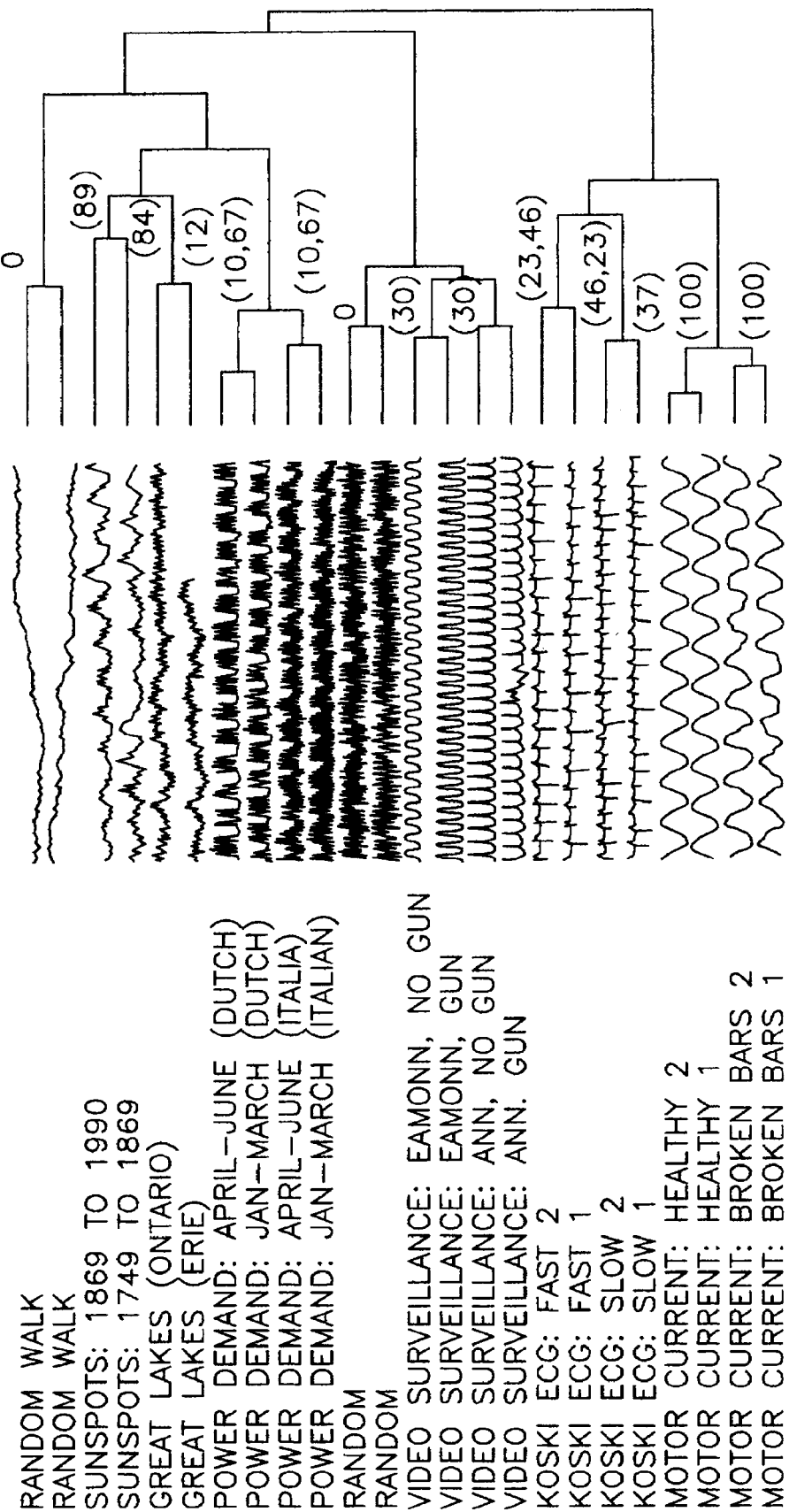
FIG. 12 depicts a dendrogram for a pDist measure, which achieves a perfect clustering.

FIG. 12 displays the resulting dendrogram for the pDist measure, which achieves a perfect clustering. One can also observe that pairs derived from the same source/process are clustered together as well, in the higher dendrogram level (Power Demand, ECG, MotorCurrent etc). After the clustering, one can execute the AUTOPERIOD method and annotate the dendrogram with the important periods of every sequence. Some sequences, like the random walk or the random data, do not contain any periodicities, indicated with an empty set { }. When both sequences at the lower level display the same periodicity, a single set is displayed on the bifurcation for clarity.

For many datasets that came into 2 pairs (power demand, video surveillance, motor current), all 4 instances demonstrated the same basic period (as suggested by the AUTOPERIOD). However, the periodic measure can effectively separate them into two pairs, because the power content of the respective frequencies was different.

Figure 13:
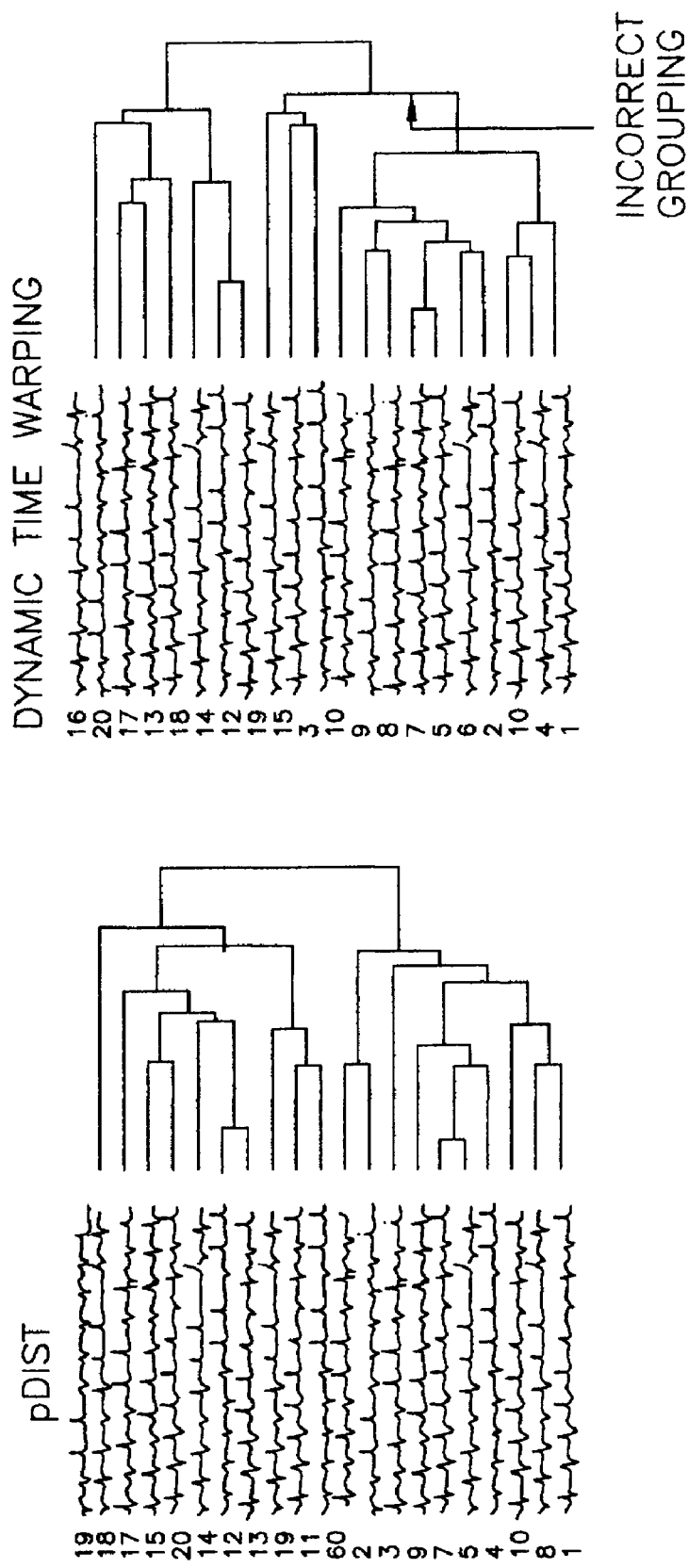
FIG. 13 depicts incorrect grouping in a 2 class ECG problem.

The last experiment is performed on the MIT-BIH Arrhythmia dataset. There are employed two sets of sequences; one with 2 classes of heartbeats and another one with three (FIGS. 13, 14). There is presented the dendrogram of the p Dist measure and the DTW, which represents possibly one of the best shape based distance measures. To tune the single parameter of the DTW (corresponding to the maximum warping length) there were probed several values and here there is reported the one that returned the best clustering.

For both dataset instances, pDist again returns an accurate clustering, while DTW seems to perform badly on the high level dendrogram aggregations, hence not leading to perfect class separation. The Euclidean distance reported worse results. The CDM measure is accurate on the 2 class separation test but does not provide a perfect separation for the 3 class problem (see the original paper [1] for respective results).

By way of recapitulation, there have been presented herein various methods for accurate periodicity estimation and for the characterization of structural periodic similarity between sequences. It is believed that these methods will find many applications for interactive exploration of time-series databases and for classification or anomaly detection of periodic sequences (e.g., in auto manufacturing, biometrics and medical diagnosis).

It is to be understood that the present invention, in accordance with at least one presently preferred embodiment, includes an arrangement for accepting time series data, an arrangement for ascertaining structural features relating to the time series data, and an arrangement for determining at least one distance between different time series and/or an arrangement for returning the k closest matches to a given time series query. Together, these elements may be implemented on at least one general-purpose computer running suitable software programs. They may also be implemented on at least one integrated Circuit or part of at least one Integrated Circuit. Thus, it is to be understood that the invention may be implemented in hardware, software, or a combination of both.

If not otherwise stated herein, it is to be assumed that all patents, patent applications, patent publications and other publications (including web-based publications) mentioned and cited herein are hereby fully incorporated by reference herein as if set forth in their entirely herein.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

REFERENCES

[1] E. Keogh, S. Lonardi, and A. Ratanamahatana. Towards parameter-free data mining. In *Proc. of SIGKDD*, 2004.
[2] M. Vlachos, C. Meek, Z. Vagena, and D. Gunopulos. Identification of Similarities, Periodicities & Bursts for Online Search Queries. In *Proc. of SIGMOD*, 2004.

What is claimed is:

1. An apparatus comprising:
   a processor; and
   a program storage device readable by machine, tangibly embodying a program of instructions executable by the processor, the program of instructions comprising:
   instructions for using a periodogram for extracting period candidates from time series input to the apparatus;
   instructions for verifying the period candidates using an autocorrelation function (ACF);
   wherein a period candidate is verified responsive to a determination that the period candidate resides on a hill of the ACF; and
   instructions for identify a local maximum of a period candidate determined to reside on a hill.

2. The apparatus according to claim 1, wherein a period candidate is discarded as a false alarm responsive to a determination that the period candidate does not reside on a hill of the ACF.

3. The apparatus according to claim 1, wherein the program of instructions further comprises instructions for computing both the periodogram and the ACF directly through a Fast Fourier Transform of the input time series.

4. The apparatus according to claim 1, wherein instructions for using a periodogram for extracting period candidates from time series input to the apparatus further comprise instructions for determining how much signal energy is attributed to random mechanisms via:
   permuting elements of the time series input to produce a sequence $\tilde{x}$; and
   recording a maximum power ($p_{max}$) of $\tilde{x}$ at any frequency f, wherein the maximum power is given by:

$$p_{max} = \arg\max_{f} \|\tilde{x}(f)\|^2$$

wherein only periods whose power is more than the maximum power ($p_{max}$) of $\tilde{x}$ are considered.

5. The apparatus according to claim 1, wherein the program of instructions further comprises instructions for performing an additional period trimming step for discarding periods that are either too large or too small to be considered valid.

6. The apparatus according to claim 2, wherein instructions for verifying the period candidates using an ACF further comprises instructions for approximating the ACF in the proximity of a candidate period to be verified with two linear segments, wherein an upward-downward trend of the two linear segments identifies a hill.

7. The apparatus according to claim 6, wherein instructions for identifying a local maximum of the period candidate determined to reside on a hill further comprises instructions for employing one or more of a hill climbing technique and deriving the local maximum from the two linear segments.

8. The apparatus according to claim 1, wherein:
the time series input to the apparatus comprises distinct and diverse times series input relating to a plurality of time series; and
the program of instructions further comprises:
instructions for using a measure of structural similarity that exploits a power content of one or more most dominant periods in the distinct and diverse time series input relating to a plurality of time series to effectively filter out noise.

* * * * *